EDWIN A. HEDIGER
INVENTOR.

March 18, 1969 E. A. HEDIGER 3,433,350
CONVEYOR
Filed Oct. 19, 1967 Sheet 2 of 3
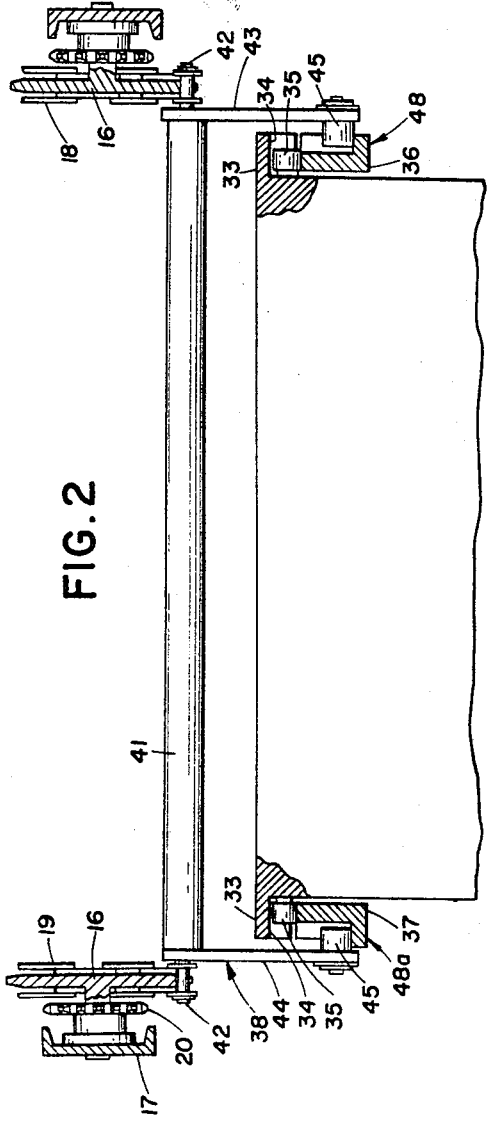
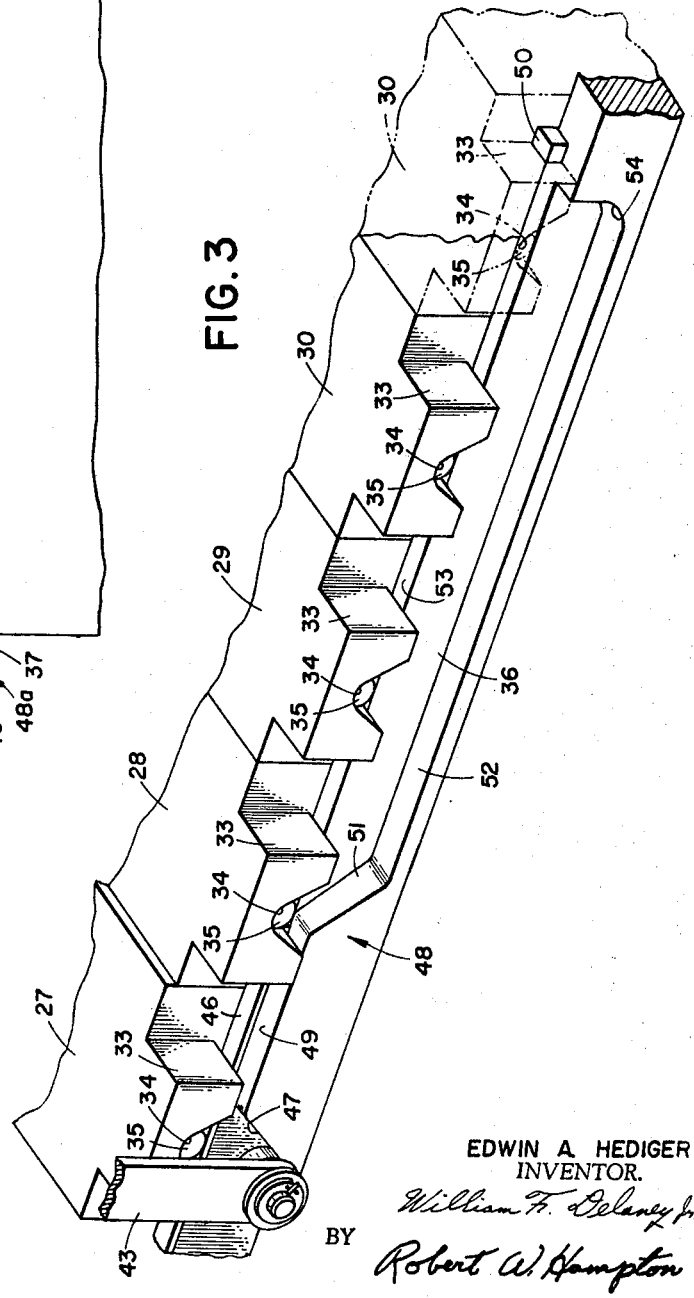
EDWIN A. HEDIGER
INVENTOR.
BY William F. Delaney Jr.
Robert A. Hampton
ATTORNEYS

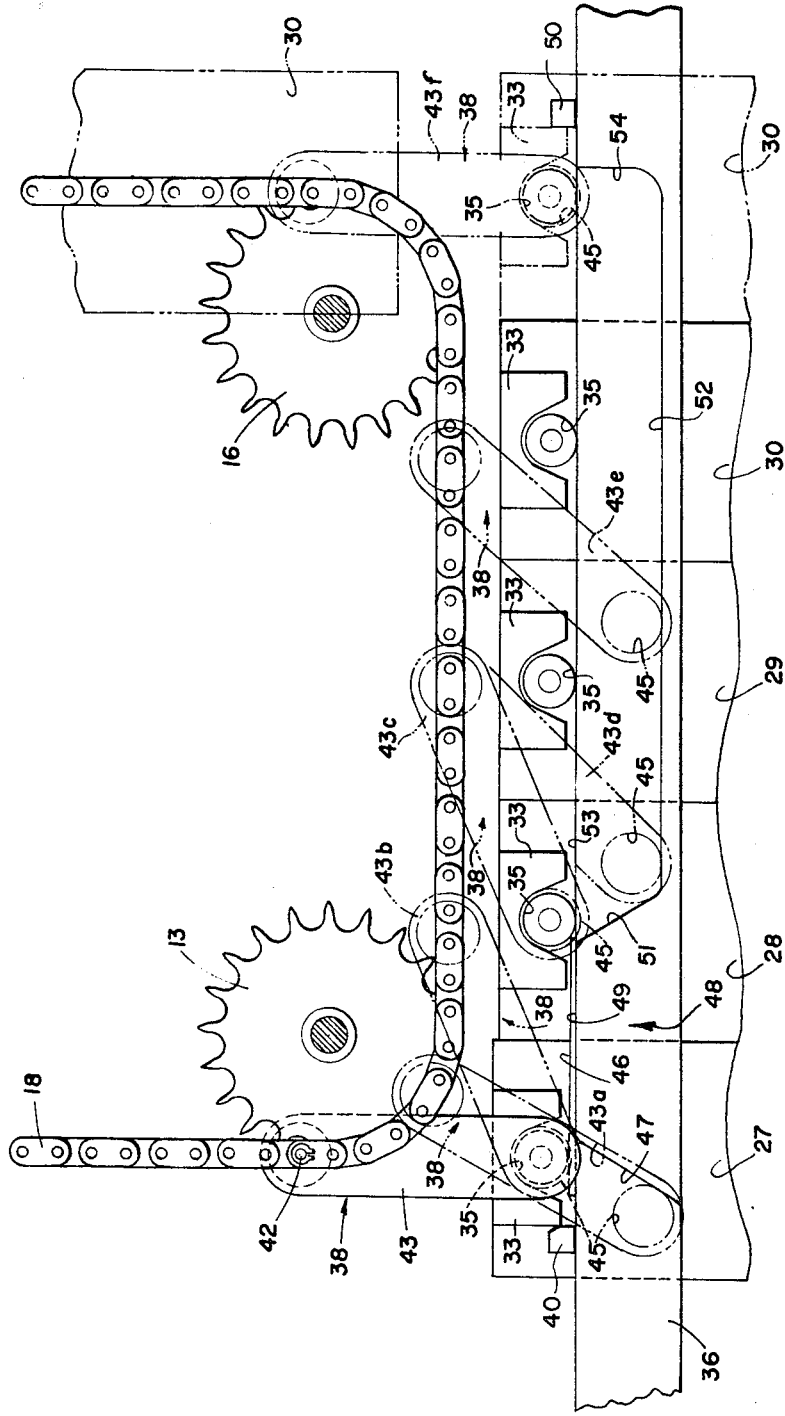

United States Patent Office 3,433,350
Patented Mar. 18, 1969

3,433,350
CONVEYOR
Edwin A. Hediger, Rochester, N.Y., assignor to Eastman Kodak Company, Rochester, N.Y., a corporation of New Jersey
Filed Oct. 19, 1967, Ser. No. 676,555
U.S. Cl. 198—177      14 Claims
Int. Cl. B65g *17/20, 37/00*

ABSTRACT OF THE DISCLOSURE

A conveyor is provided of the type in which a moving endless chain assembly or the like removes a carrier from a pick-up position at one end of a row of such carriers, transports it, deposits it at the other end of the row or at another location, and repeats the sequence after the row of carriers has been shifted to locate the succeeding carrier in the pick-up position. A simple mechanism for effecting this series of operations comprises a hook member movably supported by the chain assembly and cooperable with a cam member adjacent the row of carriers to move the hook member into and out of engagement with those carriers in a predetermined sequence as the hook member moves along the cam member.

BACKGROUND OF THE INVENTION

The present invention relates to conveyor devices and has particular utility with conveyor devices of the type in which a carrier located at a pick-up position at one end of a row such carriers is engaged with a movable endless chain assembly or the like, transported along a predetermined path, and deposited at the other end of the row or another location, whereupon the same operations are performed on the succeeding carrier after the row has been shifted to locate that carrier at the pick-up position. More particularly, the invention relates to an extremely simple and reliable mechanism, incorporated in a conveyor device, for engaging and disengaging a chain assembly or the like with carriers and for shifting the latter successively into a pick-up position, whereby such operations are effected in predetermined sequence in a positive synchronism with the movement of the chain assembly.

In various applications involving the use of conveyor systems, it is desirable to provide means whereby a number of carriers are successively removed from and returned to a dwell position in which they remain for a time interval exceeding a single transport cycle of the conveyor system. For example, if employed to deliver containers of components to a work station where they are removed from their carriers and replaced with similar containers of finished articles previously assembled from corresponding components, such a system allows a number of carriers to be concurrently emptied of assembled articles and refilled with components, rather than requiring these operations to be performed each time a carrier arrives at a particular location. In previously devised conveyor systems of this general type, however, the means employed to achieve this mode of operation generally have been relatively complex and in some cases quite delicate, thereby increasing substantially the cost of the conveyor system and detracting from its reliability.

SUMMARY OF THE INVENTION

According to the present invention, such relatively complicated mechanisms are replaced by a simple, reliable and rugged structure comprising a unitary hook member movably attached to a conveyor transport or chain assembly and adapted to be moved into and out of engagement with the carriers in predetermined sequence by a cam member adjacent the row of carriers at the dwell location as the hook member moves along the cam member. Thus, this simple arrangement automatically engages and disengages the conveyor chain assembly and the carrier being transported thereby and also effects the required shifting of the row of carriers at the dwell location in positive response to the continuous or intermittent movement of the chain assembly, without recourse to any supplemental movable machine elements. Additionally, the invention also provides equally simple and reliable means for preventing reverse movement of the shifted row of carriers, likewise without requiring the use of movable latch members or the like as have been employed for that purpose in prior devices of the same general type.

Various means for practicing the invention and other advantages and features thereof will be apparent from the following detailed description of an illustrative preferred embodiment thereof, reference being made to the accompanying drawings in which like reference numerals refer to like elements and in which:

BRIEF DESCRIPTION OF THE DRAWINGS

FIG. 2 is a side elevational view, partially in cross section, of a portion of the apparatus shown in FIG. 1, illustrating one of the hook members adjacent a carrier supported in dwell position by a pair of support rails;

FIG. 3 is an enlarged perspective partial view of the cam members and the portions of the carriers adjacent thereto after a carrier has been returned to the dwell location but before the row of carriers has been shifted to move another carrier into the pick-up position as illustrated in broken lines; and FIG. 4 is an enlarged view of a portion of FIG. 1, showing progressive positions of the hook member and the carriers supported by the support rails as the hook member engages and moves along the cam member.

DESCRIPTION OF THE PREFERRED EMBODIMENTS

Figure 1:
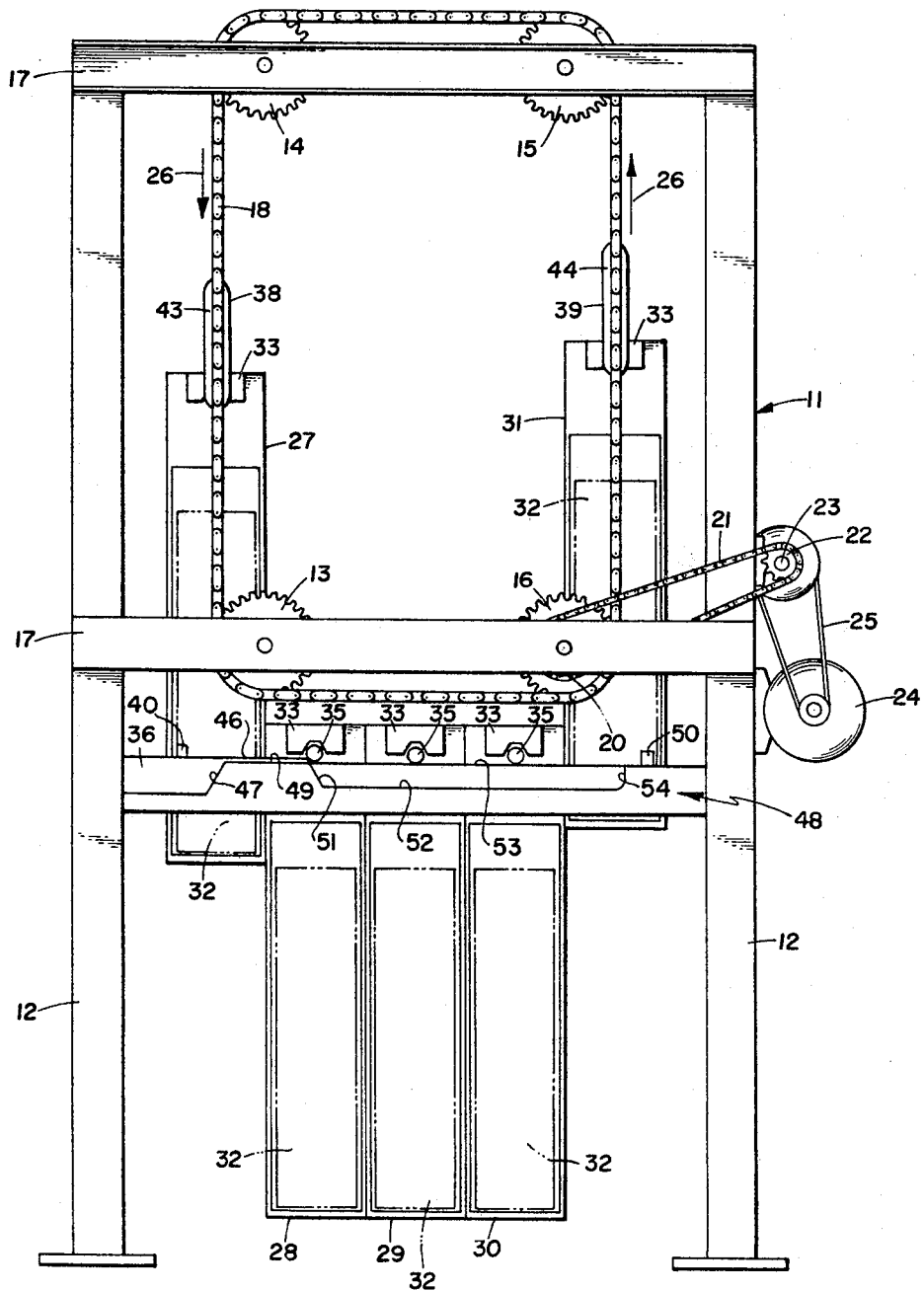
FIG. 1 is a schematic front end elevational view of a conveyor apparatus according to a preferred embodiment of the invention.

As illustrated in FIGS. 1 and 2, the various elements of the overall conveyor apparatus are supported by a rigid exterior support frame 11 comprsing four vertical columns 12. Adjacent each end of the upper portion of the frame, four sprockets 13 through 16 are rotatably supported in opposed relation to corresponding sprockets at the opposite end of the frame by outwardly projecting shafts received in bearings attached to frame cross members 17 supported by the vertical frame columns. The conveyor chain assembly comprises two endless roller chains 18 and 19, which are trained around the corresponding sets of sprockets so that the chains are movable along generally rectangualr paths in parallel vertical planes. To drive the chains along such paths in synchronism with each other, the two corresponding sprockets 16 are provided with smaller sprockets 20 connected by toothed drive belts 21 to similar sprockets 22 at the opposite ends of rotatable countershaft 23. The countershaft, in turn, is driven by a unidirectional motor 24 by drive belt 25, whereby energization of the motor causes both conveyor chains to be driven in the direction shown by arrows 26.

The illustrated conveyor apparatus employs five substantially identical carriers, designated respectively by numerals 27 through 31, each of which comprises a box-like structure open at both ends to receive a removable container or the like as shown in broken lines at 32. As is best illustrated by FIGS. 2 and 3, each of the carriers includes near its top end a pair of support lugs 33 extending forwardly and rearwardly beyond the container-receiving portion of the carrier and defining inverted angular notches 34 located above corresponding support rollers 35 rotatably attached to the carrier.

Parallel support rails 36 and 37 are mounted to the vertical frame columns below and inwardly of the lower horizontal portions of the paths of the respective conveyor chains, with the top surfaces of the rails in level horizontal alignment so that a plurality of carriers can be supported between the rails by their respective support rollers.

To support and transport the carriers successively along a predetermined conveyor path while those carriers not in the process of being transported remain supported in dwell position between the support rails, two hook members 38 and 39 are attached to the conveyor chain at equally spaced points therealong. FIG. 2 best illustrates the construction of the hook members, each of which comprises a cross bar 41 provided with end pins 42 extending through opposite link pivot holes in the respective conveyor chains to rotatably support the cross bar between the chains in parallel relation to the axes of the opposed sprockets. Since the movement of the two chains is synchronized by countershaft 23, as previously explained, it should therefore be apparent that the cross bars remain at all times in parallel relation to each other and to the axes of the opposed sprockets as the bars are moved through generally rectangular paths by the chains.

At the ends of each cross bar, hook arms 43 and 44 are welded or otherwise rigidly attached to the bar for pendulous movement therewith, such arms serving to support inwardly facing hook rollers 45, which are adapted to removably suspend a carrier between the conveyor chains, without imparting twisting forces to the chains, by engaging the corresponding notches defined by the support lugs of the carrier.

FIG. 1 illustrates the machine at the stage of operation in which carrier 27, supported by hook member 38, is descending into the return position at one end of the support rails, while hook member 39 is simultaneously lifting carrier 31 out of the pick-up position at the opposite end of the support rails. As the movement of the chain assembly continues, it should be apparent that carrier 31 will ascend beyond the support rails and will then be moved laterally, during which movements it is brought into alignment with one or more work stations or the like at which it can be loaded or unloaded or both. While such loading and unloading operations might be performed while the carirer is in motion, it is obviously preferable in most instances to stop the conveyor chain temporarily when the carrier reaches a work station, which can readily be accomplished by automatic electric switch means, not shown, in series with motor 24.

During the above-described progressive movement of carrier 31, carrier 27 continues to descend while supported by hook member 38 until its support rollers 35 are in supporting engagement with the raised upper edge surfaces 46 of the support rails as shown in FIGS. 3 and 4. With the carrier thus supported by its support rollers, it is prevented from rolling into either direction by resting carrier 28 on one side and by stop member 40 on its other side. With the carrier in this return position, further downward movement of hook member 38 causes its hook rollers to move out of engagement with the carrier, whereupon the hook roller on the front hook arm 43 comes into rolling contact with upwardly sloped cam surface 47 of cam member 48 adjacent support rail 36. Simultaneously, the hook roller on the rear hook engages a corresponding surface of an identically profiled cam member along support rail 37, as shown at 48a in FIG. 2. Accordingly, as the rollers continue to move downwardly in contact with these cam surfaces 47, the hook arms are displaced to the position shown at 43a in FIG. 4 by rotating the entire hook member about the axis of its cross bar. Since both hook arms are rigidly attached to the cross shaft, only one cam member is actually essential to the operation of the machine, but it is preferable to employ two such members, as described, to eliminate undue distortive forces on the hook member and the conveyor chains, particularly if the conveyor is adapted to carry heavily loaded carriers.

By the time the hook member reaches the above-described position, its cross bar is positioned along the horizontal lower portion of the chain path and is being moved laterally, thereby causing the hook rollers to ride upwardly along cam surfaces 47 and to reengage the adjacent ear notches of carrier 27 as the rollers move onto horizontal upper cam surfaces 49 as shown at 43b. Meanwhile, the movement of the other hook member 39 has raised carrier 31 beyond the support rails so that further movement of the chains can now shift carrier 27 laterally along support surfaces 46, thereby displacing carriers 28, 39, and 30 in the same direction. When such lateral movement of carriers 27 through 30 has moved carrier 30 into the pick-up position defined by its engagement with stop member 50, as shown in broken lines in FIGS. 3 and 4, the rollers on hook member 38 encounter downwardly sloped cam surfaces 51 which allow the rollers to descend out of engagement with carrier 27 and into contact with lower cam surfaces 52 as illustrated at 43d. At the same time, the support rollers on carrier 27 have reached the end of the raised upper surfaecs 46 of the support rails and have dropped onto the somewhat lower horizontal edge surfaces 53 of the rails, thereby preventing the carriers along the support rails from rolling back toward the return position. Accordingly, the carriers now remain stationary as the rollers of hook member 38 bypass the shifted intermediate carriers 28 and 29 while supported by lower cam surfaces 52 as shown at 43e. Finally, the hook rollers reach the vertical cam surfaces 54, which guide the rollers at 43f into the lug notches of carrier 30. Hence, further movement of the chains now raises carrier 30 out of the pick-up position, as shown in broken lines in FIG. 4, while carrier 31 is simultaneously returned to the opposite end of the support rails to complete the operating cycle. As the machine continues to run, this same cycle is repeated indefinitely to transport successive ones of the carriers through the conveyor path, thereby allowing the apparatus to function in connection with a continuous assembly operation or the like.

In the above-described embodiment of the invention the conveyor transport assembly comprises a pair of endless chains. However, it should be apparent that other types of conveyor members may be employed in the conveyor transport assembly, such as synchronized toothed belts for example.

Although only two of the carriers of the illustrated apparatus are entirely removed from the support rails at any time, it should be understood that any number of carriers might be transported along the conveyor chains simultaneously if the chains were extended, e.g. to travel along a path extending laterally beyond the support rails. Similarly, the conveyor system could deposit the carriers at another dwell station or location, rather than returning it to the original dwell position. It should also be understood that additional carriers might be supported along support rails of greater length to further increase the interval between loading and unloading operations performed on those carriers located in the dwell position along the rails.

The invention has been described in detail with particular reference to preferred embodiments thereof, but it will be understood that variations and modifications can be effected within the spirit and scope of the invention.

I claim:

1. In a conveyor of the type in which a moving endless conveyor transport assembly engages and removes a carrier from a pick-up position at one end of a row of such carriers, transports it along a predetermined path, deposits it at another location, shifts the row of carriers to locate a succeeding carrier thereof at said pick-up position, and then repeats the foregoing sequence of operations, the improvement comprising:

(a) support means for supporting said row of carriers for movement along said support means, (b) means for guiding said conveyor transport assembly along a path including a portion adjacent said row of carriers, (c) a hook member suspended from said conveyor transport assembly, (d) hook receiving means on each of said carriers engageable by said hook member to releasably attach said carriers to said conveyor transport assembly, and (e) a cam member adjacent said row of carriers and engageable by said hook member as the latter is moved by said conveyor transport assembly along the portion of said path adjacent said row of carriers, said cam member including in order of engagement by said hook member, (1) a first cam surface for guiding said hook member into engagement with the hook receiving means of the last carrier positioned at the end of said row away from the pick-up position, (2) a second cam surface for maintaining said hook member in such engagement with said last carrier to effect lateral movement of said row of carriers along said support means toward said pick-up position, (3) a third cam surface for guiding said hook member out of such engagement with said last carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

2. In a conveyor of the type in which a moving endless conveyor chain assembly engages and removes a carrier from a pick-up position at one end of a row of such carriers, transports it along a predetermined path, deposits it at another location, shifts the row of carriers to locate a succeeding carrier thereof at said pick-up position and the repeats the foregoing sequence of operations, the improvement comprising:

(a) support means for supporting said row of carriers for movement along said support means, (b) means for guiding said chain assembly along a path including a portion adjacent said row of carriers, (c) a hook member suspended from said chain assembly, (d) hook receiving means on each of said carriers, engageable by said hook member to releasably attach said carriers to said chain assembly, and (e) a cam member adjacent said row of carriers and engageable by said hook member as the latter is moved by said chain assembly along the portion of said path adjacent said row of carriers, said cam member including in order of engagement by said hook member, (1) a first cam surface for guiding said hook member into engagement with the hook receiving means of the last carrier positioned at the end of said row away from the pick-up position, (2) a second cam surface for maintaining said hook member in such engagement with said last carrier to effect movement of said row of carriers along said support means toward said pick-up position, (3) a third cam surface for guiding said hook member out of such engagement with said last carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

3. In a conveyor of the type in which a moving endless conveyor chain assembly engages and removes a carrier from a pick-up position at one end of a row of such carriers, transports it along a predetermined path, deposits it at another location, shifts the row of carriers to locate a succeeding carrier thereof at said pick-up position and then repeats the foregoing sequence of operations, the improvement comprising:

(a) support means for supporting said row of carriers for substantially horizontal movement along said support means, (b) guide means for guiding said chain assembly along a path including a substantially horizontal portion adjacent said row of carriers and including an ascending portion adjacent said pick-up position, (c) a hook member pivotally suspended from said chain assembly, (d) hook receiving means on each of said carriers engageable by said hook member to releasably attach said carriers to said chain assembly, and (e) a cam member adjacent said row of carriers and engageable by said hook member as the latter is moved by said chain assembly along the portion of said path adjacent said row of carriers, said cam member including in order of engagement by said hook member, (1) a first cam surface for guiding said hook member into engagement with the hook receiving means of the last carrier positioned at the end of said row away from the pick-up position, (2) a second cam surface for maintaining said hook member in such engagement with said last carrier to effect lateral movement of said row of carriers along said support means toward said pick-up position, (3) a third cam surface for guiding said hook member out of such engagement with said last carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

4. In a conveyor of the type in which a moving endless conveyor chain assembly engages and removes a carrier from a pick-up position at one end of a row of such carriers, transports it along a predetermined path, deposits it at a return position at the opposite end of said row, shifts the row of carriers to locate a succeeding thereof at said pick-up position and then repeats the foregoing sequence of operations, the improvement comprising:

(a) support means for supporting said row of carriers for movement along said support means, (b) guide means for guiding said chain assembly along a path including a portion adjacent said row of carriers between said return and pick-up positions, (c) a hook member pivotally suspended from said chain assembly, (d) hook receiving means on each of said carriers engageable by said hook member to releasably attach said carriers to said chain assembly, and (e) a cam member adjacent said row of carriers and engageable by said hook member as the latter is moved by said chain assembly along the portion of said path adjacent said row of carriers, said cam member including in order of engagement by said hook member, (1) a first cam surface for pivotally guiding said hook member into engagement with the hook receiving means of the last returned carrier deposited by said hook member in said return position at one end of said row, (2) a second cam surface for maintaining said hook member in such engagement with said returned carrier to effect movement of said row of carriers along said support means toward said pick-up position, (3) a third cam surface for guiding said hook member out of such engagement with said returned carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

5. A conveyor according to claim 4 in which:

(a) said conveyor chain assembly comprises two endless conveyor chains, (b) said guide means synchronously guides said chains along respective opposed movement paths in parallel planes straddling said row of carriers, and (c) said hook member comprises:

(1) a horizontal cross bar pivotally supported between said chains in perpendicular relation thereto, (2) a pair of hook arms attached to and depending from said cross bar in spaced relation for pendulous movement about the pivot axis of said cross bar, and (3) a carrier engaging member attached to each of said hook arms.

6. A conveyor according to claim 5 in which said hook receiving means on each of said carriers comprises a pair of lug members projecting laterally from respective opposite sides of each of said carriers and adapted to be straddled by said hook arms of said hook member, said lug members having notches in the lower faces thereof adapted to receive said carrier engaging members of said hook member.

7. The invention defined by claim 5 in which said carrier engaging members comprise rotatable roller elements, at least one of which is adapted to engage and roll along said surfaces of said cam member to effect predetermined sequential pivotal movement of said hook member.

8. A conveyor according to claim 5 in which:

(a) said support means comprises a pair of elongated stationary spaced support rails positioned below corresponding ones of said chains in parallel relation to the movement planes thereof, and (b) each of said carriers is provided with a pair of support rollers adapted to support said carrier on said rails.

9. The invention defined by claim 8 in which said top surfaces of said support rails include elevated horizontal portions engaged by said support rollers of a carrier located in said return position and lower horizontal portions engaged by said rollers when that carrier is moved laterally by said hook member past said return position toward said pick-up position.

10. In a conveyor of the type which engages and removes a carrier from a pick-up position at one end of a row of such carriers, transports it along a predetermined path, deposits it at another location, shifts the row of carriers to locate a succeeding carrier thereof at said pick-up position and then repeats the foregoing sequence of operations, the combination comprising:

(a) a pair of support rails for supporting said row of carriers for movement along said support rails, (b) two endless conveyor chains supported for movement along respective opposed parallel paths including portions adjacent to and straddling said row of carriers, (c) a hook member comprising:

(1) a cross bar pivotally supported between said chains in perpendicular relation thereto, (2) a pair of hook arms attached to and depending from said cross bar in spaced relation for unitary pendulous movement about the pivot axis of said cross bar, and (3) a carrier engaging member attached to each of said hook arms, (d) hook receiving means on each of said carriers engageable by said hook member to releasably attach said carriers to said chains, and (e) a cam member adjacent said row of carriers and engageable by said hook member as the latter is moved by said chains adjacent said row of carriers, said cam member including in order of engagement by said hook member, (1) a first cam surface for pivotally guiding said hook member into engagement with the hook receiving means of the last carrier positioned at the end of said row away from the pick-up position, (2) a second cam surface for maintaining said hook member in such engagement with said last carrier to effect movement of said row of carriers along said support rails toward said pick-up position, (3) a third cam surface for guiding said hook member out of such engagement with said last carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

11. In a conveyor of the type which engages and removes a carrier from a pick-up position at one end of a row of such carriers, transports it along a predetermined path, deposits it at another location, shifts the row of carriers to locate a succeeding carrier thereof at said pick-up position and then repeats the foregoing sequence of operations, the combination comprising:

(a) a pair of support rails for supporting said row of carriers for movement along said support rails, (b) two endless conveyor members supported for movement along respective opposed parallel paths including portions adjacent to and straddling said row of carriers, (c) a hook member comprising:

(1) a cross bar pivotally supported between said conveyor members in perpendicular relation thereto, (2) a pair of hook arms attached to and depending from said cross bar in spaced relation for unitary pendulous movement about the pivot axis of said cross bar, and (3) a carrier engaging member attached to each of said hook arms, (d) hook receiving means on each of said carriers engageable by said hook member to releasably attach said carriers to said conveyor members, and (e) a cam member adjacent said row of carriers and engageable by said hook member as the latter is moved by said conveyor member along the portions of said paths adjacent said row of carriers, said cam member including in order of engagement by said hook member, (1) a first cam surface for pivotally guiding said hook member into engagement with the hook receiving means of the last carrier positioned at the end of said row away from the pick-up position, (2) a second cam surface for maintaining said hook member in such engagement with said last carrier to effect lateral movement of said row of carriers along said support rails toward said pick-up position, (3) a third cam surface for guiding said hook member out of such engagement with said last carrier when said row of carriers has been so moved to locate the carrier at the opposite end thereof in said pick-up position, (4) a fourth cam surface for guiding said hook member past the intermediate carriers of said row out of engageable relation with the hook receiving means thereof, and (5) a fifth cam surface for guiding said hook member into engagement with the hook receiving means of the carrier located in said pick-up position.

12. A conveyor according to claim 11 in which said hook receiving means on each of said carriers comprises a pair of lug members, projecting laterally from respective opposite sides of each of said carriers and adapted to be straddled by said hook arms of said hook member, said lug members having inverted notches in the lower faces thereof adapted to receive said engaging members of said hook arms.

13. A conveyor according to claim 11 in which said carrier engaging members comprise rotatable roller elements, at least one of which is adapted to engage and roll along said surfaces of said cam member to effect predetermined sequential pivotal movement of said hook member.

14. In a conveyor of the type in which a moving endless flexible conveyor member engages and removes a carrier from a pick-up position at one end of a row of such carriers, transports it along a predetermined path, deposits it at another location, shifts the row of carriers to locate a succeeding carrier thereof at said pick-up position and then repeats the foregoing sequence of operations, the improvement comprising:

(a) support means for supporting said row of carriers for movement along said support means, (b) means for guiding said conveyor member along a path including a portion adjacent said row of carriers, (c) a hook member suspended from said conveyor member, (d) hook receiving means on each of said carriers, engageable by said hook member to releasably attach said carriers to said conveyor member, and (e) cam means adjacent said row of carriers and engageable by said hook member as the latter is moved by said conveyor member along the portion of said path adjacent said row of carriers, said cam means being operative to guide said hook member into engagement with the hook receiving means of the last carrier positioned at the end of said row away from the pick-up position to effect movement of said row of carriers along said support means toward said pick-up position, then to effect disengagement of said hook member from said last carrier when said row of carriers has been so moved to locate the carrier at the opposite end thereof in said pick-up position, and then to guide said hook member into engagement with the hook receiving means of the carrier located in said pick-up position.

References Cited

UNITED STATES PATENTS

| | | | |
|---|---|---|---|
| 3,172,527 | 3/1965 | Swartz | 198—138 |
| 2,868,354 | 1/1959 | Harrison | 198—177 |

RICHARD E. AEGERTER, *Primary Examiner.*

U.S. Cl. X.R.

198—85